United States Patent [19]

Bladh

[11] 3,957,222

[45] May 18, 1976

[54] SAFETY BELTS OF WIND-UP TYPE FOR VEHICLES

[76] Inventor: Carl Rutger Bladh, Krusbarsvagen 5, Vilsharad, S-305-90 Halmstad, Sweden

[22] Filed: Jan. 15, 1975

[21] Appl. No.: 541,084

[30] Foreign Application Priority Data
Jan. 21, 1974   Sweden............................. 7400727

[52] U.S. Cl............................ 242/107; 242/167.4 R
[51] Int. Cl.².......................................... B65H 75/48
[58] Field of Search............ 242/107.4, 107 R, 107, 242/107.4 R; 297/386, 388; 280/150 SB

[56] References Cited
UNITED STATES PATENTS

| | | | |
|---|---|---|---|
| 3,163,467 | 12/1964 | Deneay.............................. | 297/388 |
| 3,343,623 | 9/1967 | Porter.................................. | 180/82 |
| 3,746,274 | 7/1973 | Yang................................ | 242/107.4 |

*Primary Examiner*—Edward J. McCarthy
*Attorney, Agent, or Firm*—Shlesinger, Fitzsimmons & Shlesinger

[57] ABSTRACT

The invention relates to safety belts of the wind-up type for vehicles. In these safety belts the belt strap, connected to a shaft rotatably mounted in a casing and tending to be reeled up on the shaft by the action of a spiral spring member tightened by the unwinding of the strap from the shaft when the strap is pulled out and laid across the chest of the strapped user, exerts an often unpleasant pressure on the chest of said user. The invention provides a means adapted to counterbalance this pressure when the strap approaches and is kept in the position of use across the chest of the user, but not to interfere with the retractive or reeling-up force exerted by the spiral spring member on the strap in positions outside said position of use.

6 Claims, 6 Drawing Figures

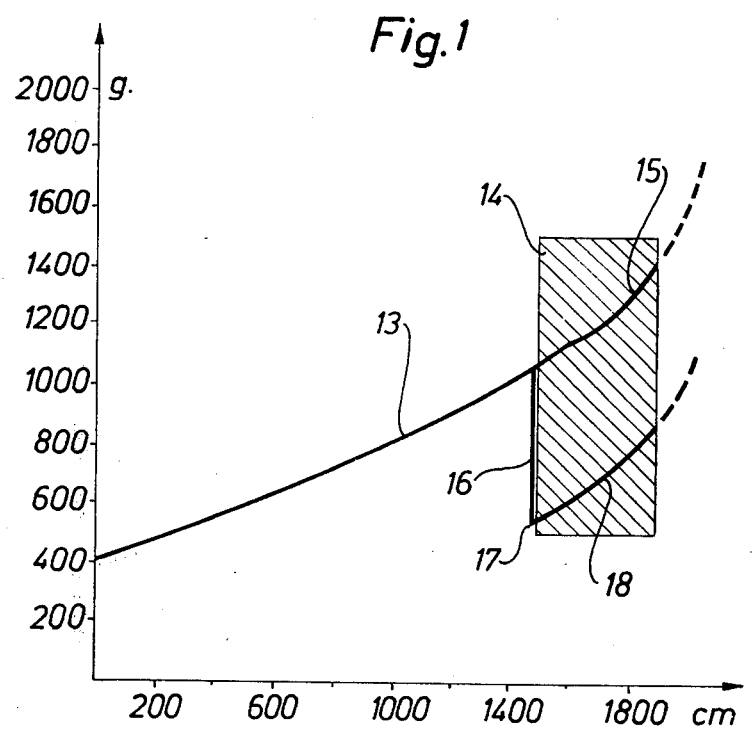

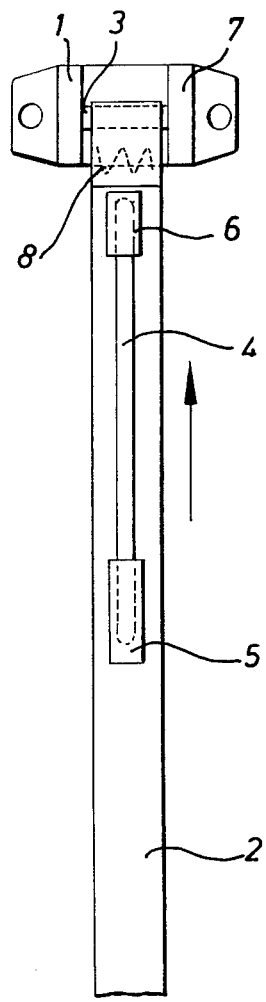
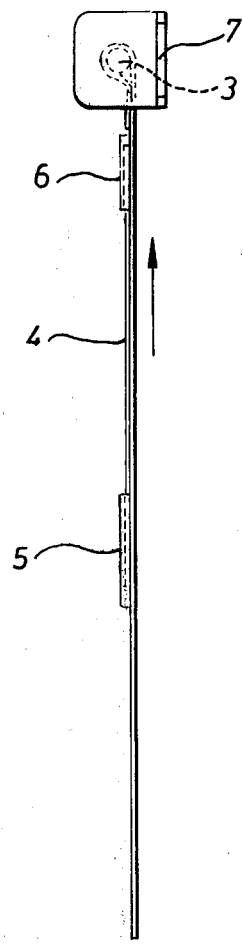
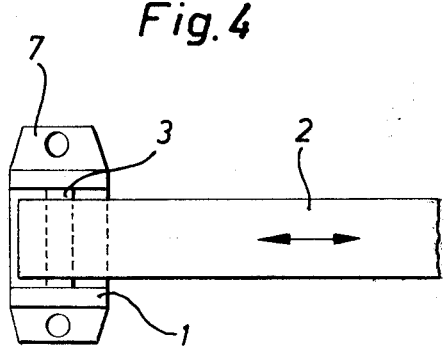

SAFETY BELTS OF WIND-UP TYPE FOR VEHICLES

FIELD OF THE INVENTION

This invention relates generally to safety belts of the wind-up type for vehicles.

More particularly this invention relates to improvements in or relating to safety belts of the wind-up type intended for vehicles and comprising a shaft rotatably mounted in a casing, a spiral spring member connected with said shaft, a belt strap adapted to be wound about said shaft, said spiral spring member being disposed to be tightened by unwinding said strap from said shaft.

THE PRIOR ART

In the construction of the winding or reeling device for a vehicle seat safety belt of the wind-up type, one has hitherto been compelled to compromise between two contradictory requirements. The reeling device must produce so great a tractive force that the belt strap actually is drawn to its entire length into the casing and wound up on the shaft. However, the reeling force must not be so great as to exert an unpleasant pressure onto the chest of the person using the safety belt. The spiral spring member provided in the shaft casing formally imparts to the reeling force a very unfavorable progress. Thus, the reeling force has been the very smallest when the major part of the strap had been reeled up inside the casing. This had as a consequence that the winding-up of the outer portion of the strap had been very unreliable. However, the reeling force has been considerably greater when the major portion of the strap had been unwound, i.e. when the safety belt was in use. In this way, the belt strap has exerted a relatively great pressure against the chest of the person strapped by the belt without, however, for that reason ensure reliable reeling-up.

MAIN OBJECTS OF THE INVENTION

One main object of the invention is to provide means for counter-balancing the force acting on the belt strap in the reeling-up direction so as to reduce this force when the strap is pulled out into, and kept in, its position of use. This implies that the reeling-up force of the spiral spring member can be directed so as to ensure reliable retraction of the strap into the shaft casing in the final stage of retraction without in the position of use necessitating an annoying pressure to be exerted on the chest of the strapped user.

MAIN FEATURES OF THE INVENTION

According to one main feature of the invention this object is attained by a device generally represented by a resilient member or spring element arranged along the belt strap, said spring element having such shape and such position relative the strap that when the strap has been drawn out into the region for its position of use, said spring element is unwound from the shaft and thereby produces a force counterdirected to the force emanating from the spiral spring member.

THE DRAWINGS

Further objects and advantages of the invention will become apparent from the following description, considered with reference to some embodimments thereof illustrated by way of example in the accompanying drawings, which form part of this specification and of which:

FIG. 1 is a graph showing the reeling or retraction force acting on the belt strap as a function of pulled-out length of the strap firstly in a conventional vehicle safety belt of the wind-up type and secondly in a safety belt embodying the features of the invention.

FIG. 2 shows a safety belt in entirely uncoiled state equipped with the means according to the invention.

FIG. 3 is a lateral view of the safety belt shown in FIG. 2.

FIG. 4 shows the safety belt according to FIG. 2 with the strap in reeled-up position.

DETAILED DESCRIPTION OF PREFERRED EMBODIMENTS

Figure 5:
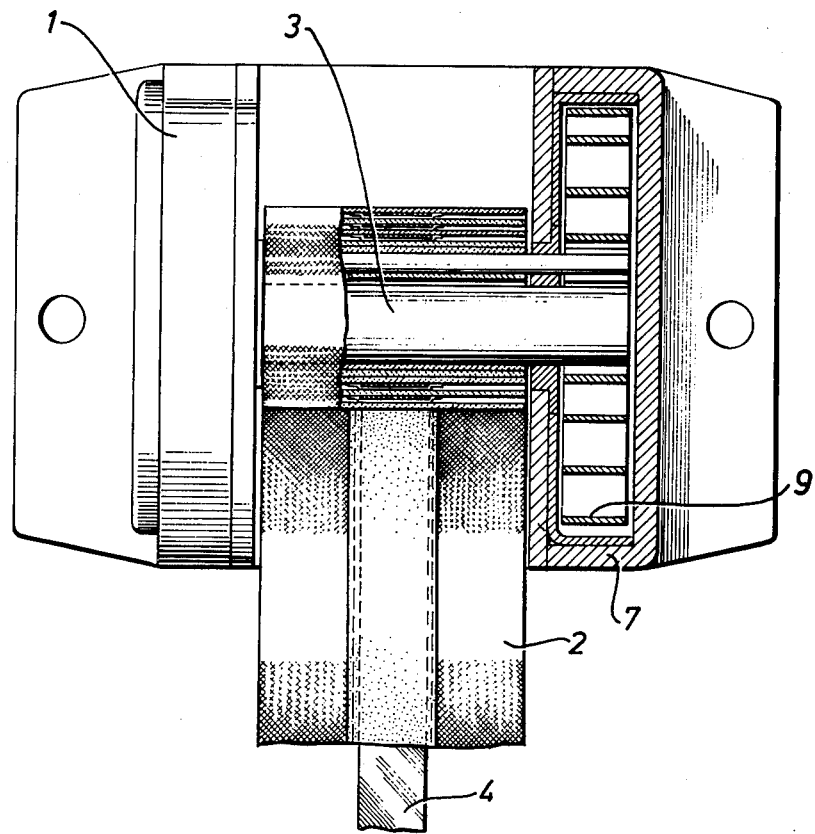
FIG. 5 shows another embodiment of the safety belt according to the invention with belt strap and shaft casing represented in a partially sectional view and with the strap in partly pulled-out position.

Referring now to the drawings and in particular FIGS. 2 through 5, a safety belt of wind-up type for vehicles comprises a moment member or casing 7, within which a shaft or reel 3 is mounted rotatably. The shaft 3 is connected with a spiral spring member 9 and a belt strap 2, which is adapted automatically to be retracted and reeled-up about the shaft 3 by means of the spring member 9. The casing 7 also contains a mechanism 1 which becomes operative as soon as the vehicle is subjected to a change in speed exceeding a predetermined order of magnitude. Such mechanism is disclosed per se in e.g. the U.S. Pat. No. 3,521,832 and the co-pending U.S. Pat. application Ser. No. 386,380, filed Aug. 7, 1973, and shall not be described here in detail, since it does not form part of the present invention.

As is indicated at 8 in FIG. 2, the belt strap 2 can be secured about the shaft 3 by sewing. The strap can also, which, however, is not shown in the drawings, be attached to the shaft 3 by some suitably shaped metal clamp or the like means.

The feature which distinguishes the safety belt according to the invention from conventional safety belts of the wind-up type is the resilient member or spring element 4, which is arranged along the inner portion of the strap 2. In the embodiment shown in FIGS. 2 and 3, the spring element 4 has its inner end fixed to the strap 2 by means of a textile ribbon 6, which is secured by sewing to the strap so that a covered channel is formed. The spring element can also be fixed to the shaft 3 by means of that fastening member which is used for the fixing of the belt strap proper. At least the outer end of the spring element 4 must in addition be connected with the strap 2, which in a simple manner can be effected by means of a textile ribbon 5 sewed thereon and of approximately the same kind as the ribbon 6 used for the fixing of the inner end of the spring element. It is essential that the inner end of the spring element 4 is fixed to the strap 2 or the shaft 3 in such a manner that it will not be displaceable relative the longitudinal direction of the strap. The remaining parts of the spring element 4 and especially its outer end must, however, be attached to the strap 2 in such a manner that they can be displaced in the longitudinal direction of said strap 2. Most suitably, the spring element 4 consists of a strip of resilient material which has a plane configuration in its unloaded condition. Such material may be spring steel or some suitable plastic material.

Figure 6:
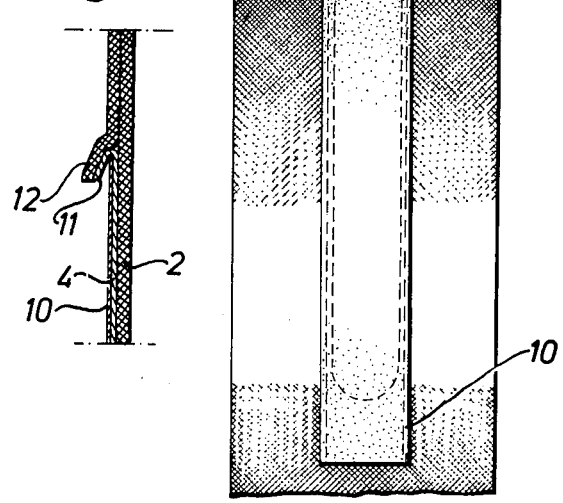
FIG. 6 is a cross-sectional view of the inner portion of the strap and the spring element mounted thereon.

In the embodiment shown in FIGS. 5 and 6 the spring element 4 to its entire length is covered by a ribbon 10 secured onto the strap 2. Then the inner end of the spring element 4 may be bent over, as indicated at 11 in FIG. 6 and pushed over the inner end of the ribbon 10. The bentover portion 11 may be hidden below the end tip 12 of the strap 2.

When pulling out the belt strap 2 and thereby unwinding it from the shaft 3, the spring element 4, after that the strap has been drawn out from the casing 7 for a predetermined portion of its length, will be relieved from the winding turns about the shaft. Since the spring element 4 consists of a plane strip in its unloaded state, it will, as soon as it begins to become straightened from its wound-up state, begin to exert a torque which is counterdirected to the torque exerted by the spiral spring member 9. This counter-directed torque will be maintained as long as the spring element partly is wound up about the shaft 3. To the contrary, when the spring element 4 is wound up completely on the shaft, the counterdirected torque will end, and the only force which determines the retractive or reeling-up force will be the torque from the spiral spring member 9.

EXPLANATION OF THE ADVANTAGEOUS EFFECT OBTAINED BY THE INVENTION

The advantageous effect won by the invention is evident from the graph, FIG. 1, wherein the ordinate represents the reeling-up or retractive force exerted by the spiral spring member on the strap 2 expressed in grams and the abscissa the length drawn out of the strap 2 from the casing 7, expressed in centimeters. The characteristic line of the spiral spring follows a curve of the second degree type, i.e. it grows more rapidly than corresponds to the drawn-out length of the strap. Within the area 14 denoted by short lines, the srap is in its position of use, i.e. it is strapped over the chest of the user. According to the curve portion 13, the strap is subjected only to the action of the spiral spring member 9. The curve portion 15 shows how the reeling-up or retractive force very strongly is increased within the area 14, which results in the inconveniences for the user stated in the introductory part of this description.

According to the invention, there is produced by the straight auxiliary spring element 4 a counterdirected torque, which results in that the force acting on the strap 2 is caused to decrease considerbly according to the curve portion 16 to a point 17 as soon as said spring element begins to become operative when relieved from the winding turns about the shaft 3. When continuing the pulling-out of the strap, the reeling-up force rises again according to the curve portion 18, but, as will be seen from the graph, this curve portion is all the time located far below the curve portion 15 which represents the conventional construction. It is easily understood that the auxiliary spring element is inactive as long as it is wound about the shaft 3, for which reason the retraction of the strap is effected with the force according to the curve portion 13, which force thus can be chosen so that it is sufficiently great as in the final stage also to ensure reliable and rapid reeling-up of the strap. When the strap has been pulled out so much as to reach its position of use, the auxiliary spring element becomes active so as to reduce the reeling-up force acting on the strap to a substantially lower value. The force exerted in point 17 can be varied by varying the breadth or/and thickness of the auxiliary spring element. — If the spring element 4 in unloaded state is bent in opposite direction to the windings to be imparted to it when forced about the shaft 3, the torque produced by it and counter-acting the torque exerted by the spiral spring member on the strap 2, becomes still greater.

By imparting to the spring element a thickness and breadth which varies in the longitudinal extension thereof, the curve portion 18 can be flattened.

It is easily understood from the preceding description that the auxiliary spring element 4 does not participate in the exertion of force on the strap when this strap is subjected to traction force. However, it is conceivable in some cases that said strap constitutes an additional holder member for the strap 2 adjacent the shaft 3. Obviously, it then also is a condition that said auxiliary spring element produces a torque opposite to that emanating from the spiral spring member 9 in order to keep the reeling-up force at a low value within the region of use denoted 14 in the graph of FIG. 1.

While several more or less specific embodiments of the invention have been shown and described, it is to be understood that this is for purpose of illustration only and that the invention is not to be limited thereby, but its scope is to be determined by the appended claims.

What is claimed is:

1. A safety belt of wind-up type for a vehicle, comprising a shaft rotatably mounted in a casing, a spiral spring member connected with said shaft, a strap adapted normally to be wound up about said shaft by said spring member, said spiral spring member being disposed to be tightened by unwinding said strap from said shaft during movement of said strap to its position of use, and characterized by a spring element arranged along said strap, said spring element having such shape and such position relative to the strap that when the strap has been drawn out into the region for its position of use, said spring element is unwound from the shaft and thereby produces a force counterdirected to the force emanating from the spiral spring member, thus reducing the force exerted on said strap by said spring member.

2. The safety belt as claimed in claim 1, characterized in that the spring element in its unloaded state has the shape of a plane strip.

3. The safety belt as claimed in claim 1, characterized in that the spring element in its unloaded state has the shape of a strip bent oppositely to the direction said element is bent when wound on said shaft.

4. The safety belt as claimed in claim 1, characterized in that the inner end of the spring element is fixed to the inner end portion of said strap.

5. The safety belt as claimed in claim 1, characterized in that the outer end of the spring element is attached to said strap for limited displacement longitudinally thereof.

6. The safety belt as claimed in claim 1, characterized in that the spring element has a thickness amounting to a fraction only of the breadth of said strap.

* * * * *